United States Patent
Oi

(10) Patent No.: US 6,790,917 B2
(45) Date of Patent: Sep. 14, 2004

(54) PROCESS FOR PRODUCING VINYL COMPOUND POLYMER

(75) Inventor: Nobuo Oi, Narashino (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/151,253

(22) Filed: May 21, 2002

(65) Prior Publication Data

US 2002/0198340 A1 Dec. 26, 2002

(30) Foreign Application Priority Data

May 22, 2001 (JP) ........................................ 2001-152270

(51) Int. Cl.[7] .................................................. C08F 4/52
(52) U.S. Cl. ........................ 526/153; 526/151; 526/160; 526/943; 526/308; 526/348.2; 526/134
(58) Field of Search ................................. 526/160, 170, 526/134, 943, 348.2, 348.3, 348.4

(56) References Cited

U.S. PATENT DOCUMENTS

| | | | |
|---|---|---|---|
| 5,594,081 A | 1/1997 | Uchino et al. | 526/127 |
| 5,869,586 A | 2/1999 | Riedel et al. | 526/170 |
| 6,040,469 A | 3/2000 | Riedel et al. | 556/53 |
| 6,225,423 B1 * | 5/2001 | Andell et al. | 526/75 |
| 6,288,193 B1 | 9/2001 | Iseki et al. | 526/348.6 |
| 6,388,031 B1 | 5/2002 | Oi et al. | |
| 6,420,506 B1 | 7/2002 | Oi et al. | 526/347 |
| 2002/0091217 A1 * | 7/2002 | Oi et al. | 526/348.1 |
| 2002/0198340 A1 * | 12/2002 | Oi | 526/160 |

FOREIGN PATENT DOCUMENTS

| | | | | |
|---|---|---|---|---|
| DE | 199 51 277 A1 | 5/2000 | | |
| EP | 0513380 A1 | 11/1992 | | |
| EP | 0 513 380 A1 * | 11/1992 | ........... | C08F/10/00 |
| EP | 1 197 501 A2 | 4/2002 | | |
| WO | WO 93/21242 | 10/1993 | | |

OTHER PUBLICATIONS

Longo et al., Makromol Chem., vol. 191, pp. 2387–2396, (1990).
Nekhaeva et al., Polymer Science USSR, vol. 32, No. 9, pp. 1868–1872, (1990).
Mani et al., Polymer, vol. 34, No. 9, pp. 1941–1943, (1993).
Lofgren et al., "Ethylene Copolymerization and Vinylcyclohexane using different Metallocene Catalyst Systems", Organometallic Catalysts and Olefin Polymerization New Millenium International Conference, Jun. 18–22, 2000, Oslo, Norway.

* cited by examiner

Primary Examiner—David W. Wu
Assistant Examiner—Rip A. Lee
(74) Attorney, Agent, or Firm—Birch, Stewart, Kolasch & Birch, LLP

(57) ABSTRACT

A process for producing a polymer, which comprises polymerizing a vinyl compound (I) represented by the general formula $CH_2=CH-R$, wherein steric parameters Es and B1 of the substituent R are respectively −1.64 or less and 1.53 or more, or a vinyl compound (II) represented by the general formula $CH_2=CH-R'$, wherein a substituent R' is a secondary or tertiary alkyl group, in the presence of a catalyst obtained by combining:

(A) a transition metal compound represented by the general formula [1]

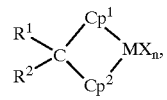

[1]

(B) an organoaluminum compound and
(C) a boron compound.

4 Claims, 9 Drawing Sheets

PROCESS FOR PRODUCING VINYL COMPOUND POLYMER

BACKGROUND OF THE INVENTION

1. Field of the Invention

The present invention relates to a process for producing a polymer of a vinyl compound having a bulky substituent.

2. Description of Related Art

In the field of polymerization of olefins such as polyethylene and polypropylene, a development in which a polymer different in properties from ordinary polymers can be produced has been done by appearance of single-site catalyst such as so-called metallocene and non-metallocene catalysts.

With respect to polymerization of a vinyl compound having a bulky substituent such as vinylcyclohexane, application of such a catalyst is proposed, and for example, processes for producing copolymers of ethylene and vinylcyclohexane are disclosed in Polymer Science USSR, Vol.32, No.9, 1868–1872(1990), and Polymer, vol.134(9), 1941(1993).

Such a polymer of the vinyl compound having a bulky substituent exhibits similar properties to polyvinyl chloride, therefore are expected as non-chlorine materials. However, in the known process, the copolymerizability of the vinyl compound having a bulky substituent used is low (namely, the ratio of units derived from the vinyl compound having a bulky substituent contained in a obtained polymer is rather low compared to the ratio of the vinyl compound fed in polymerization). Therefore, it was difficult to obtain efficiently a copolymer having high ratio of the units derived from the vinyl compound having a bulky substituent, further also to obtain a homopolymer of the vinyl compound having a bulky substituent.

SUMMARY OF THE INVENTION

An object of the present invention is to provide a process for producing efficiently a homopolymer of the vinyl compound having a bulky substituent or a copolymer containing units derived from the vinyl compound having a bulky substituent with a good copolymerizability.

Namely, the present invention relates to a process for producing a polymer which comprises polymerizing a vinyl compound (I) represented by the general formula $CH_2=CH-R$, wherein steric parameters Es and B1 of the substituent R are respectively −1.64 or less and 1.53 or more or a vinyl compound (II) represented by the general formula $CH_2=CH-R'$, wherein a substituent R' is a secondary or tertiary alkyl group, in the presence of a catalyst obtained by combining:

(A) a transition metal compound represented by the general formula [1]

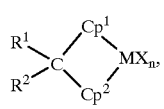

[1]

wherein M represents a transition metal; each of Cp1 and Cp2 independently cyclopentadiene type anion skeleton; each of R1 and R2 independently represents a hydrogen atom or hydrocarbon group having 1 to 20 carbon atoms, and they may connect and form a ring structure through C; X represents a halogen atom, hydrocarbon group having 1 to 20 carbon atoms or hetero atom; and n represents a number of 0 to 4;

(B) at least one aluminum compound selected from the following (B1) to (B3):

(B1) an organoaluminum compound represented by the general formula $E^1{}_aAlZ_{3-a}$, (B2) a cyclic aluminoxane having a structure represented by the general formula $\{-Al(E^2)-O-\}_b$, and (B3) a linear aluminoxane having a structure represented by the general formula $E^3\{-Al(E^3)-O-\}_c AlE^3{}_2$, (wherein $E^1$ to $E^3$ respectively represents a hydrocarbon group having 1 to 8 carbon atoms, and all of $E^1$, $E^2$ and $E^3$ may be the same or different; Z represents a hydrogen atom or a halogen atom, and all of Z may be the same or different; a represents a numeral satisfying $0<a\leq 3$; b represents an integer of not less than 2; and c represents an integer of not less than 1); and (C) at least one boron compound selected from the following (C1) to (C3):

(C1) a boron compound represented by the general formula $BQ^1Q^2Q^3$, (C2) a boron compound represented by the general formula $G^+(BQ^1Q^2Q^3Q^4)^-$, and (C3) a boron compound represented by the general formula $(L-H)^+(BQ^1Q^2Q^3Q^4)^-$ (wherein B is a boron atom in the trivalent valence state, $Q^1$–$Q^4$ are a halogen atom, a hydrocarbon group, a halogenated hydrocarbon group, a substituted silyl group, an alkoxy group or a di-substituted amino group, which may be the same or different, respectively. $G^+$ is an inorganic or organic cation, L is a neutral Lewis base, and $(L-H)^+$ is a Brønsted acid.)

DETAILED DESCRIPTION OF THE INVENTION

Figure 1:
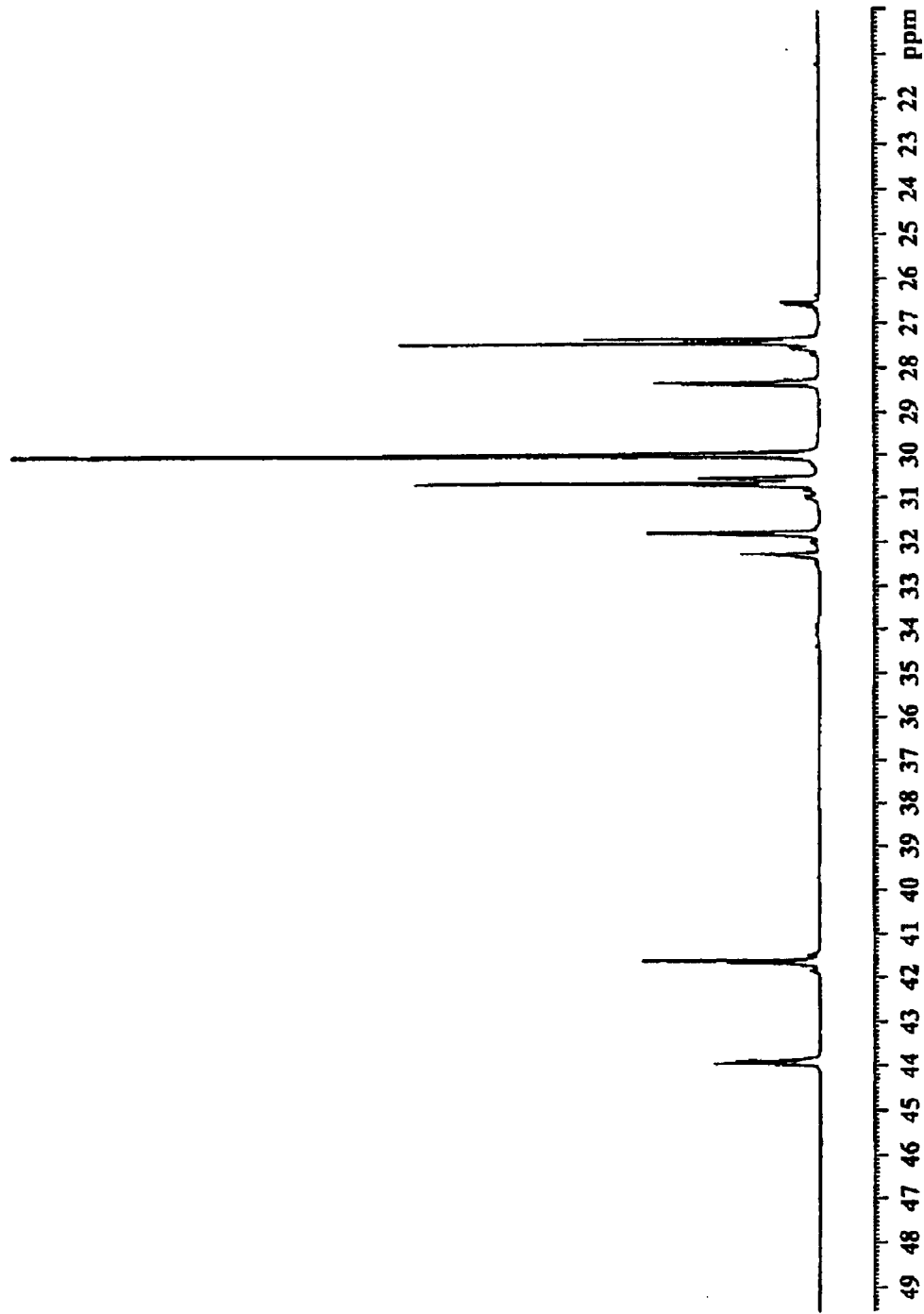
FIG. 1 is a $^{13}$C-NMR spectrum of the polymer obtained in Example 1.

In the present invention, the transition metal compound used as a catalyst component for addition-polymerizing a vinyl compound having a bulky substituent is a transition metal compound represented by the general formula [1], preferably a (substituted)methylene bridging type bis Cp metallocene compound.

In the general formula[1], M represents a transition metal compound. As the transition metal, various transition metals are listed, and transition metal compounds of the Group 4 of the Periodic Table of the Elements (1993, IUPAC) such as a titanium atom, zirconium atom and hafnium atom are preferable and a titanium atom and zirconium atom are more preferable. In the general formula[1], $Cp^1$ and $Cp^2$ respectively independently represent a group having a cyclopentadienyl type anion skeleton, for example, an $\eta^5$-(substituted)cyclopentadienyl group, $\eta^5$-(substituted)indenyl group, $\eta^5$-(substituted)fluorenyl group and the like are listed. Specific examples of the substituted group include a methyl group, ethyl group, n-propyl group, isopropyl group, n-butyl group, isobutyl group, tert-butyl group, phenyl group, naphthyl group, anthracenyl group, phenanthryl group, fluorine atom, chlorine atom, bromine atom, methoxy group, phenoxy group, furyl group and the like. The number of the substituted group may be one, two or more, and a plurality of the substituted group may form a ring structure. As the group having a cyclopentadienyl type anion skeleton, an $\eta^5$-(substituted)indenyl group is preferable.

In the transition metal compound represented by the general formula[1], two groups having a cyclopentadienyl type anion skeleton($Cp^1$ and $Cp^2$) are connected through a carbon atom.

In the general formula[1], respective R1 and R2 independently represents a hydrogen atom or hydrocarbon group having 1 to 20 carbon atoms, and they may combine to form a ring structure together with C(carbon atom).

Herein, the hydrocarbon group includes alkyl groups, aralkyl groups, aryl groups and the like, preferably alkyl groups having 1 to 20 carbon atoms, aralkyl groups having 7 to 20 carbon atoms and aryl groups having 6 to 20 carbon atoms.

Specific examples of the alkyl group having 1 to 20 carbon atoms include a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-octyl group, a n-decyl group, a n-dodecyl group, a n-pentadecyl group, a n-eicosyl group and the like are listed. A methyl group, an ethyl group, an isopropyl group, a tert-butyl group, an isobutyl group or n-pentyl group is more preferable.

Specific example of the aralkyl group having 7 to 20 carbon atoms include a benzyl group, (2-methylphenyl)methyl group, (3-methylphenyl)methyl group, a (4-methylphenyl) methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (3,5-dimethylphenyl)methyl group, (2,3,4-timethylphenyl)methyl group, (2,3,5-timethylphenyl)methyl group, (2,3,6-timethylphenyl)methyl group, (3,4,5-timethylphenyl)methyl group, (2,4,6-timethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-oct ylphenyl)methyl group, (n-decylphenyl)methyl group, (n-dodecylphenyl)methyl group, naphthylmethyl group, anthracenylmethyl group and the like, and a benzyl group is more preferable.

Specific examples of the aryl group having 6 to 20 carbon atoms include a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group and the like, and a phenyl group is more preferable.

Preferably, respective R1 and R2 is a hydrogen atom, methyl group, ethyl group, n-propyl group, isopropyl group, n-butyl group, phenyl group, 2,6-diisopropyl group or benzyl group.

When R1 combine with R2 together with C to form a ring structure, cyclobutylidene group, cyclopentylidene group, cyclohexilidene group, cyclooctylidene group, 2,5-dimethyl cyclopentylidene group or the like are formed.

X in the general formula[1] represents a halogen atom, hydrocarbon group having 1 to 20 carbon atoms, or hetero atom, and n is a number of 0 to 4 (when n is zero, X is none).

As a halogen atom, a fluorine atom, chlorine atom, bromine atom, iodine atom are listed, and a chlorine is preferable. The hydrocarbon groups are the same as those described in R1 and R2, and a methyl group, ethyl group, n-propyl group, isopropyl group, n-butyl group, phenyl group, 2,6-diisopropyl group or benzyl group is preferable.

The hetero atom in the group containing a hetero atom includes a nitrogen atom, a phosphorus atom an oxygen atom, a sulfur atom and the like, and examples thereof include hydrocarbonamino group, hydrocarbon amino group, hydrocarbonthio group and the like, and preferably an alkoxy group, aryloxy group, alkylthio group, arylthio group, dialkylamino group, diarylamino group, dialkylphosphino group, or diarylphosphino group, more preferably a methoxy group, ethoxy group, n- or iso-propoxy group, n-, sec-, iso- or tert-butoxy group, phenoxy group, thiomethoxy group, dimethylamino group, diethylamino group, dipropylamino group, dibutylamino group, diphenyl amino group, pyrroryl group or dimethylphosphino group.

Further, specific examples of the transition metal compound represented by the general formula[1] include isopropylidenebis(cyclopentadienyl)titanium dichloride, isopropylidenebis(2-methylcyclopentadienyl)titanium dichloride, isopropylidenebis(3-methylcyclopentadienyl) titanium dichloride, isopropylidenebis(2-n-butylcyclopentadienyl)titanium dichloride, isopropylidenebis(3-n-butylcyclopentadienyl)titanium dichloride, isopropylidenebis(2,3-dimethylcyclopentadienyl)titanium dichloride, isopropylidenebis(2,4-dimethylcyclopentadienyl)titanium dichloride, isopropylidenebis(2,5-dimethylcyclopentadienyl)titanium dichloride, isopropylidenebis(3,4-dimethylcyclopentadienyl)titanium dichloride, isopropylidenebis(2,3-ethylmethylcyclopentadienyl)titanium dichloride, isopropylidenebis(2,4-ethylmethylcyclopentadienyl) titanium dichloride, isopropylidenebis(2,5-ethylmethylcyclopentadienyl)titanium dichloride, isopropylidenebis(3,5-ethylmethylcyclopentadienyl)

titanium dichloride, isopropylidenebis(2,3,4-trimethylcyclopentadienyl)titanium dichloride, isopropylidenebis(2,3,5-trimethylcyclopentadienyl)titanium dichloride, isopropylidenebis(tetramethylcyclopentadienyl) titanium dichloride, isopropylidenebis(1-indenyl)titanium dichloride, isopropylidenebis(2-methyl-1-indenyl)titanium dichloride, isopropylidenebis(3-methyl-1-indenyl)titanium dichloride, isopropylidenebis(2-n-butyl-1-indenyl)titanium dichloride, isopropylidenebis(3-n-butyl-1-indenyl)titanium dichloride, isopropylidenebis(2,3-dimethyl-1-indenyl)titanium dichloride, isopropylidenebis(2,4-dimethyl-1-indenyl)titanium dichloride, isopropylidenebis(2,5-dimethyl-1-indenyl)titanium dichloride, isopropylidenebis(3,4-dimethyl-1-indenyl)titanium dichloride, isopropylidenebis(2,3-ethylmethyl-1-indenyl)titanium dichloride, isopropylidenebis(2,4-ethylmethyl-1-indenyl)titanium dichloride, isopropylidenebis(2,5-ethylmethyl-1-indenyl)titanium dichloride, isopropylidenebis(3,5-ethylmethyl-1-indenyl)titanium dichloride, isopropylidenebis(2,3,4-trimethyl-1-indenyl)titanium dichloride, isopropylidenebis(2,3,5-trimethyl-1-indenyl)titanium dichloride, isopropylidenebis(4,5,6,7-tetrahydro-1-indenyl)titanium dichloride, isopropylidenebis(2-phenyl-1-indenyl)titanium dichloride, isopropylidenebis(2-methyl-4-phenyl-1-indenyl)titanium dichloride, isopropylidenebis(3-methyl-4-phenyl-1-indenyl)titanium dichloride, isopropylidenebis(2-methyl-5-phenyl-1-indenyl)titanium dichloride, isopropylidenebis(3-methyl-5-phenyl-1-indenyl)titanium dichloride, isopropylidenebis(4,5-benzo-1-indenyl)titanium dichloride isopropylidenebis(2-n-butyl-1-indenyl)titanium dichloride, 1,1-cyclopentylidenebis(1-indenyl)titanium dichloride, isopropylidenebis(3-cyclopenta[c]phenanthryl)titanium dichloride, isopropylidenebis(9-fluorenyl)titanium dichloride, isopropylidene (cyclopentadienyl) (tetramethylcyclopentadienyl)titanium dichloride, isopropylidene(cyclopentadienyl)(1-indenyl)titanium dichloride, isopropylidene (methylcyclopentadienyl) (1-indenyl)titanium dichloride, isopropylidene(n-butylcyclopentadienyl)(1-indenyl)titanium dichloride, isopropylidene (tetramethylcyclopentadienyl) (1-indenyl)titanium dichloride, isopropylidene (cyclopentadienyl)(9-fluorenyl)titanium dichloride, isopropylidene (methylcyclopentadienyl)(9-fluorenyl)titanium dichloride, isopropylidene(n-butylcyclopentadienyl)(9-fluorenyl)titanium dichloride, isopropylidene (tetramethylcyclopentadienyl) (9-fluorenyl)titanium dichloride, isopropylidene (1-indenyl) (9-fluorenyl)titanium dichloride, methylenebis(cyclopentadienyl)titanium dichloride, methylenebis(2-methylcyclopentadienyl) titanium dichloride, methylenebis(3-methylcyclopentadienyl)titanium dichloride, methylenebis (2-n-butylcyclopentadienyl)titanium dichloride, methylenebis (3-n-butylcyclopentadienyl)titanium dichloride, methylenebis(2,3-dimethylcyclopentadienyl) titanium dichloride, methylenebis(2,4-dimethylcyclopentadienyl)titanium dichloride, methylenebis(2,5-dimethylcyclopentadienyl)titanium dichloride, methylenebis(3,4-dimethylcyclopentadienyl) titanium dichloride, methylenebis(2,3-ethylmethylcyclopentadienyl)titanium dichloride, methylenebis(2,4-ethylmethylcyclopentadienyl)titanium dichloride, methylenebis(2,5-ethylmethylcyclopentadienyl) titanium dichloride, methylenebis(3,5-ethylmethylcyclopentadienyl)titanium dichloride, methylenebis(2,3,4-trimethylcyclopentadienyl)titanium dichloride, methylenebis(2,3,5-trimethylcyclopentadienyl) titanium dichloride, methylenebis (tetramethylcyclopentadienyl)titanium dichloride, isopropylidenebis (1-indenyl)titanium dichloride, methylenebis(2-methyl-1-indenyl)titanium dichloride, methylenebis(3-methyl-1-indenyl)titanium dichloride, methylenebis(2-n-butyl-1-indenyl)titanium dichloride, methylenebis(3-n-butyl-1-indenyl)titanium dichloride, methylenebis(2,3-dimethyl-1-indenyl)titanium dichioride, methylenebis(2,4-dimethyl-1-indenyl)titanium dichloride, methylenebis(2,5-dimethyl-1-indenyl)titanium dichloride, methylenebis(3,4-dimethyl-1-indenyl)titanium dichloride, methylenebis(2,3-ethylmethyl-1-indenyl)titanium dichloride, methylenebis (2,4-ethylmethyl-1-indenyl)titanium dichloride, methylenebis (2,5-ethylmethyl-1-indenyl)titanium dichloride, methylenebis(3,5-ethylmethyl-1-indenyl)titanium dichloride, methylenebis (2,3,4-trimethyl-1-indenyl) titanium dichloride, methylenebis(2,3,5-trimethyl-1-indenyl)titanium dichloride, methylenebis(tetramethyl-1-indenyl)titanium dichloride, methylenebis(4,5,6,7-tetrahydro-1-indenyl)titanium dichloride, methylenebis(2-phenyl-1-indenyl)titanium dichloride, methylenebis(2-methyl-4-phenyl-1-indenyl)titanium dichloride, methylenebis(3-methyl-4-phenyl-1-indenyl)titanium dichloride, methylenebis(2-methyl-5-phenyl-1-indenyl) titanium dichloride, methylenebis(3-methyl-5-phenyl-1-indenyl)titanium dichloride, methylenebis(4,5-benzo-1-indenyl)titanium dichloride methylenebis(2-n-butyl-1-indenyl)titanium dichloride, 1,1-cyclopentylidenebis(1-indenyl)titanium dichloride, methylenebis(3-cyclopenta[c]phenanthryl) titanium dichloride, methylenebis(9-fluorenyl) titanium dichloride, methylene(cyclopentadienyl) (tetramethylcyclopentadienyl)titanium dichloride, methylene (cyclopentadienyl) (1-indenyl)titanium dichloride, methylene (methylcyclopentadienyl) (1-indenyl)titanium dichloride, methylene (n-butylcyclopentadienyl)(1-indenyl) titanium dichloride, methylene (tetramethylcyclopentadienyl) (1-indenyl)titanium dichloride, methylene (cyclopentadienyl)(9-fluorenyl) titanium dichloride, methylene (methylcyclopentadienyl)(9-fluorenyl)titanium dichloride, methylene (n-butylcyclopentadienyl)(9-fluorenyl)titanium dichloride, methylene(tetramethylcyclopentadienyl) (9-fluorenyl) titanium dichloride, methylene (1-indenyl)(9-fluorenyl) titanium dichloride, diphenylmethylenebis (cyclopentadienyl)titanium dichloride, diphenylmethylenebis(2-methylcyclopentadienyl)titanium dichloride, diphenylmethylenebis(3-methylcyclopentadienyl)titanium dichloride, diphenylmethylenebis(2-n-butylcyclopentadienyl)titanium dichloride, diphenylmethylenebis(3-n-butylcyclopentadienyl)titanium dichloride, diphenylmethylenebis(2,3-dimethylcyclopentadienyl) titanium dichloride, diphenylmethylenebis(2,4-dimethylcyclopentadienyl)titanium dichloride, diphenylmethylenebis(2,5-dimethylcyclopentadienyl) titanium dichloride, diphenylmethylenebis(3,4-dimethylcyclopentadienyl)titanium dichloride, diphenylmethylenebis(2,3-ethylmethylcyclopentadienyl) titanium dichloride, diphenylmethylenebis(2,4-ethylmethylcyclopentadienyl)titanium dichloride, diphenylmethylenebis(2,5-ethylmethylcyclopentadienyl) titanium dichloride, diphenylmethylenebis(3,5-ethylmethylcyclopentadienyl)titanium dichloride, diphenylmethylenebis(2,3,4-trimethylcyclopentadienyl) titanium dichloride, diphenylmethylenebis(2,3,5-trimethylcyclopentadienyl)titanium dichloride, diphenylmethylenebis(tetramethylcyclopentadienyl)

titanium dichloride, diphenylmethylenebis(1-indenyl) titanium dichloride, diphenylmethylenebis (2-methyl-1-indenyl)titanium dichloride, diphenylmethylenebis (3-methyl-1-indenyl)titanium dichloride, diphenylmethylenebis(2-n-butyl-1-indenyl)titanium dichloride, diphenylmethylenebis(3-n-butyl-1-indenyl) titanium dichloride, diphenylmethylenebis(2,3-dimethyl-1-indenyl)titanium dichloride, diphenylmethylenebis(2,4-dimethyl-1-indenyl)titanium dichloride, diphenylmethylenebis(2,5-dimethyl-1-indenyl)titanium dichloride, diphenylmethylenebis(3,4-dimethyl-1-indenyl) titanium dichloride, diphenylmethylenebis(2,3-ethylmethyl-1-indenyl)titanium dichloride, diphenylmethylenebis(2,4-ethylmethyl-1-indenyl)titanium dichloride, diphenylmethylenebis(2,5-ethylmethyl-1-indenyl)titanium dichloride, diphenylmethylenebis(3,5-ethylmethyl-1-indenyl)titanium dichloride, diphenylmethylenebis(2,3,4-trimethyl-1-indenyl)titanium dichloride, diphenylmethylenebis(2,3,5-trimethyl-1-indenyl)titanium dichloride, diphenylmethylenebis(4,5,6,7-tetrahydro-1-indenyl)titanium dichloride, diphenylmethylenebis (2-phenyl-1-indenyl)titanium dichloride, diphenylmethylenebis(2-methyl-4-phenyl-1-indenyl) titanium dichloride, diphenylmethylenebis(3-methyl-4-phenyl-1-indenyl)titanium dichloride, diphenylmethylenebis(2-methyl-5-phenyl-1-indenyl) titanium dichloride, diphenylmethylenebis(3-methyl-5-phenyl-1-indenyl)titanium dichloride, diphenylmethylenebis(4,5-benzo-1-indenyl)titanium dichloride isopropylidenebis(2-n-butyl-1-indenyl)titanium dichloride, diphenylmethylenebis(3-cyclopenta[c] phenanthryl)titanium dichloride, diphenylmethylenebis(9-fluorenyl)titanium dichloride, diphenylmethylene (cyclopentadienyl) (tetramethylcyclopentadienyl)titanium dichloride, diphenylmethylene(cyclopentadienyl)(1-indenyl)titanium dichloride, diphenylmethylene (methylcyclopentadienyl) (1-indenyl)titanium dichloride, diphenylmethylene(n-butylcyclopentadienyl)(1-indenyl) titanium dichloride, diphenylmethylene (tetramethylcyclopentadienyl) (1-indenyl)titanium dichloride, diphenylmethylene (cyclopentadienyl)(9-fluorenyl)titanium dichloride, diphenylmethylene (methylcyclopentadienyl)(9-fluorenyl)titanium dichloride, diphenylmethylene(n-butylcyclopentadienyl)(9-fluorenyl) titanium dichloride, diphenylmethylene (tetramethylcyclopentadienyl) (9-fluorenyl)titanium dichloride, diphenylmethylene(1-indenyl)(9-fluorenyl) titanium dichloride, and the like.

Further, compounds in which titanium is replaced with zirconium or hafnium in the above compounds are also exemplified.

Among these, preferable examples include isopropylidenebis(1-indenyl)zirconium dichloride, isopropylidenebis(4,5,6,7-tetrahydro-1-indenyl)titanium dichloride, isopropylidenebis(2-methyl-1-indenyl) zirconium dichloride, isopropylidenebis(2-phenyl-1-indenyl)zirconium dichloride, isopropylidenebis(4,5-benzo-1-indenyl)zirconium dichloride, 1,1-cyclopentylidenebis(1-indenyl)zirconium dichloride, isopropylidenebis(3-cyclopenta[c]phenanthryl)zirconium dichloride, isopropylidenebis(9-fluorenyl)zirconium dichloride, diphenylmethylenebis(1-indenyl)zirconium dichloride, diphenylmethylenebis (4,5,6,7-tetrahydro-1-indenyl) titanium dichloride, diphenylmethylenebis (2-methyl-1-indenyl)zirconium dichloride, diphenylmethylenebis (2-phenyl-1-indenyl)zirconium dichloride, diphenylmethylenebis(4,5-benzo-1-indenyl)zirconium dichloride, diphenylmethylenebis(3-cyclopenta[c] phenanthryl)zirconium dichloride and diphenylmethylenebis(9-fluorenyl)zirconium dichloride, more preferable examples include isopropylidenebis(1-indenyl)zirconium dichloride, isopropylidenebis(4,5,6,7-tetrahydro-1-indenyl)titanium dichloride, isopropylidenebis (2-phenyl-1-indenyl)zirconium dichloride and isopropylidenebis (4,5-benzo-1-indenyl)zirconium dichloride, and isopropylidenebis(1-indenyl)zirconium dichloride or isopropylidenebis(4,5-benzo-1-indenyl) zirconium dichloride is most preferable.

These transition metal compounds may be used alone, or in combination of two or more. In the present invention, $\mu$-oxo type or bis-$\mu$-oxo type transition metal compounds which are reaction products of 1 mole of the transition metal compounds represented by the general formula[1] with a half mole of water or equimolar of water, may be used.

The transition metal compounds represented by the general formula[1] is used as a catalyst component in addition polymerization of a vinyl compound having a bulky substituted group. In the present invention, a preferable catalyst used for addition polymerization of the vinyl compound having a bulky substituted group is a catalyst for polymerization of a vinyl compound obtained by contacting the transition metal compound(A) represented by the general formula[1] with (B) and/or (C) described below:

(B): at least one compound selected from the following (B1) to (B3):

(B1) an organoaluminum compound represented by the general formula $E^1_aAlZ_{3-a}$;

(B2) a cyclic aluminoxane having a structure represented by the general formula $\{—Al(E^2)—O—\}_b$; and (B3) a linear aluminoxane having a structure represented by the general formula $E^3\{—Al(E^3)—O—\}_cAlE^3_2$ (wherein $E^1$ to $E^3$ respectively represents a hydrocarbon group, and all of $E^1$, $E^2$ and $E^3$ may be the same or different; Z represents a hydrogen atom or a halogen atom, and all of Z may be the same or different; a represents a numeral satisfying $0<a\leq3$; b represents an integer of not less than 2; and c represents an integer of not less than 1);

(C) any one of boron compounds of (C1) to (C3) described below:

(C1) a boron compound represented by the general formula $BQ^1Q^2Q^3$;

(C2) a boron compound represented by the general formula $G^+(BQ^1Q^2Q^3Q^4)^-$; and (C3) a boron compound represented by the general formula $(L—H)^+(BQ^1Q^2Q^3Q^4)^-$ (wherein B is a boron atom in the trivalent valence state; $Q^1$ to $Q^4$ are a halogen atom, a hydrocarbon group, a halogenated hydrocarbon group, a substituted silyl group, an alkoxy group or a di-substituted amino group which may be the same or different; $G^+$ is an inorganic or organic cation; L is a neutral Lewis base; and $(L—H)^+$ is a Brønsted acid).

Preferable catalysts for polymerization of a vinyl compound are described in detail below.

(B) Aluminum Compound

In the aluminum compound (B), the hydrocarbon group in E1, E2 and E3 is preferably hydrocarbon group having 1 to 8 carbon atoms, and more preferably an alkyl group having 1 to 8 carbon atoms.

Specific examples of the organoaluminum compound (B1) represented by the general formula $E^1_aAlZ_{3-a}$ include trialkylaluminums such as trimethylaluminum, triethylaluminum, tripropylaluminum, triisobutylaluminum, trihexylaluminum, etc.; dialkylaluminum chlorides such as dimethylaluminum chloride, diethylaluminum chloride, dipropylaluminum chloride, diisobutylaluminum chloride, dihexylaluminum chloride, etc.; alkylaluminum dichlorides such as methylaluminum dichloride, ethylaluminum dichloride, propylaluminum dichloride, isobutylaluminum dichloride, hexylaluminum dichloride, etc.; and dialkylaluminum hydrides such as dimethylaluminum hydride, diethylaluminum hydride, dipropylaluminum hydride, diisobutylaluminum hydride, dihexylaluminum hydride, etc.

Among them, trialkylaluminums are preferred and triethylaluminum or triisobutylaluminum is more preferred.

Specific examples of $E^2$ and $E^3$ in (B2) a cyclic aluminoxane having a structure represented by the general formula $\{-Al(E^2)-O-\}_b$ and (B3) a linear aluminoxane having a structure represented by the general formula $E^3-\{Al(E^3)-O-\}_c AlE^3{}_2$ include alkyl group such as methyl group, ethyl group, n-propyl group, isopropyl group, n-butyl group, isobutyl group, n-pentyl group, neopentyl group, etc. b is an integer of not less than 2, c is an integer of not less than 1. Each of E and E is preferably methyl group or isobutyl group. b is from 2 to 40 and c is from 1 to 40.

The above aluminoxane is prepared by various methods. The method is not specifically limited, and the aluminoxane may be prepared according to a known method. For example, the aluminoxane is prepared by contacting a solution, which is obtained by dissolving a trialkylaluminum (e.g. trimethylaluminum, etc.) in a suitable organic solvent (e.g. benzene, aliphatichydrocarbon, etc.) with water. Also, there can be illustrated a method for preparing the aluminoxane by contacting a trialkylaluminum (e.g. trimethylaluminum, etc.) with a metal salt containing crystal water (e.g. copper sulfate hydrate, etc.).

It is considered that thus obtained aluminoxanes and commercially available aluminoxanes are generally a mixture of the (B2) and (B3).

(C) Boron Compound

In the boron compound(C1) represented by the general formula $BQ^1Q^2Q^3$, B represents a boron atom in the trivalent valence state; $Q^1$ to $Q^3$ are respectively a halogen atom, a hydrocarbon group, a halogenated hydrocarbon group, a substituted silyl group, an alkoxy group or a di-substituted amino group and they may be the same or different. Each of $Q^1$ to $Q^3$ is preferably a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms or a di-substituted amino group having 2 to 20 carbon atoms, and each of more preferable $Q^1$ to $Q^3$ is a halogen atom, a hydrocarbon group having 1 to 20 carbon atoms or a halogenated hydrocarbon group having 1 to 20 carbon atoms. Each of the more preferable $Q^1$ to $Q^3$ is a fluorinated hydrocarbon group having 1 to 20 carbon atoms which contains at least one fluorine atom, and in particular, each of $Q^1$ to $Q^3$ is preferably a fluorinated aryl group having 6 to 20 carbon atoms which contains at least one fluorine atom.

Specific examples of the compound (C1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane and the like, and tris(pentafluorophenyl)borane is most preferable.

In the boron compound (C2) represented by the general formula $G^+(BQ^1Q^2Q^3Q^4)^-$, $G^+$ is an inorganic or organic cation; B is a boron atom in the trivalent valence state; and $Q^1$ to $Q^4$ are the same as defined in $Q^1$ to $Q^3$ in the above-mentioned (C1).

Specific examples of $G^+$ as the inorganic cation in the compound represented by the general formula $G^+(BQ^1Q^2Q^3Q^4)^-$ include a ferrocenium cation, an alkyl-substituted ferrocenium cation, a silver cation and the like, and the $G^+$ as the organic cation includes a triphenylmethyl cation and the like. $G^+$ is preferably a carbenium cation, and a triphenylmethyl cation is particularly preferred. As the $(BQ^1Q^2Q^3Q^4)^-$, tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, tetrakis (3,5-bistrifluoromethylphenyl)borate and the like are mentioned.

These specific combinations include ferrocenium tetrakis(pentafluorophenyl)borate, 1,1'-dimethylferrocenium tetrakis(pentafluorophenyl)borate, silver tetrakis(pentafluorophenyl)borate, triphenylmethyl tetrakis(pentafluorophenyl)borate, triphenylmethyl tetrakis(3,5-bistrifluoro methylphenyl)borate and the like, and triphenylmethyl tetrakis (pentafluorophenyl)borate is most preferable.

Further, in the boron compound (C3) represented by the formula $(L-H)^+(BQ^1Q^2Q^3Q^4)^-$, L is a neutral Lewis base; $(L-H)^+$ is a Brønsted acid; B is a boron atom in the trivalent valence state; and $Q^1$ to $Q^4$ are the same as $Q^1$ to $Q^3$ in the above-mentioned Lewis acid (C1).

Specific examples of $(L-H)^+$ as the Brønsted acid in the compound represented by the formula $(L-H)^+(BQ^1Q^2Q^3Q^4)^-$ include a trialkyl-substituted ammonium, an N,N-dialkylanilinium, a dialkylammonium, a triarylphosphonium and the like, and examples of $(BQ^1Q^2Q^3Q^4)^-$ include those as previously described.

These specific combinations include triethylammonium tetrakis(pentafluorophenyl)borate, tripropylammonium tetrakis(pentafluorophenyl)borate, tri(n-butyl)ammonium tetrakis(pentafluorophenyl)borate, tri(n-butyl)ammonium tetrakis(3,5-bistrifluoromethylphenyl)borate, N,N-dimethylanilinium tetrakis(pentafluorophenyl)borate, N,N-diethylanilinium tetrakis(pentafluorophenyl)borate, N,N-2,4,6-pentamethylanilinium tetrakis(pentafluorophenyl)borate, N,N-dimethylanilinium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl)phosphonium tetrakis(pentafluorophenyl)borate, tri(dimethylphenyl)phosphonium tetrakis(pentafluorophenyl)borate and the like, and tri(n-butyl)ammoniumtetrakis(pentafluorophenyl)borate or N,N-dimethylaniliniumtetrakis (pentafluorophenyl)borate is most preferable.

[Polymerization]

A preferable catalyst for vinyl compound polymerization used in the present invention is a catalyst prepared by contacting the transition metal compound(A), with the compound (B) and/or compound (C) described above. Herein, the contact includes any means if the catalyst is formed through contact of the (A) with the (B) and/or (C). A method of contacting by mixing the (A) with the (B) and/or (C) previously diluted with a solvent or without diluting, method of forming the catalyst by contacting them in a polymerization vessel by supplying separately them thereto, and the like can be adopted.

As a method of supplying respective catalyst components to a polymerization vessel, the component preferably are supplied in a state of water free in an inert gas (e.g. nitrogen, argon), and in this case, these components may be supplied to the polymerization vessel separately, after previously contacting them or two of these.

In case of using a catalyst for polymerization, prepared by using two components (A) and (B), the above cyclic aluminoxane (B2) and/or linear aluminoxane (B3) are preferable as (B). Other preferable embodiment of the catalyst for olefin polymerization includes a catalyst for olefin polymerization, prepared by using the above (A), (B) and (C). As (B), the above (B1) is easily used.

The respective components are desirably used so that the molar ratio of (B)(in terms of Al atom contained in (B))/(A) is usually within the range from 0.1 to 10000, preferably 5 to 2000 and the molar ratio of (C)/(A) is usually within the range from 0.01 to 100, preferably 0.5 to 10.

When the respective components are used in the state of a solution or state suspended in a solvent, the concentration of the respective components is appropriately selected according to the conditions such as ability of an apparatus for feeding the respective components in a polymerization reactor. The respective components are desirably used so that the concentration of (A) is usually from 0.01 to 500 $\mu$mol/g, preferably from 0.05 to 100 $\mu$mol/g, more preferably from 0.05 to 50 $\mu$mol/g; the concentration of (B) is usually from 0.01 to 10000 $\mu$mol/g, preferably from 0.1 to 5000 $\mu$mol/g, more preferably from 0.1 to 2000 $\mu$mol/g, in terms of Al atom; and the concentration of (C) is usually from 0.01 to 500 $\mu$mol/g, preferably from 0.05 to 200 $\mu$mol/g, more preferably from 0.05 to 100 $\mu$mol/g.

As the catalyst used in the present invention, an inorganic carrier such as $SiO_2$, $Al_2O_3$ or the like, and a particle-like carrier including an organic polymer carrier such as a polymer of an olefin such as ethylene, styrene or the like, etc. may be used in combination.

In practicing of the present invention process, the polymerization process has no restriction in particular, and an arbitrary process such as, for example, a batch-wise or continuous gas phase polymerization process, bulk polymerization process, solution polymerization process or slurry polymerization process using an appropriate solvent, or the like can be used. When a solvent is used, various kind of solvents under a condition of not deactivating a catalyst can be used, and examples of such solvent include a hydrocarbon such as benzene, toluene, pentane, hexane, heptane, cyclohexane and the like; and a halogenated hydrocarbon such as methylene dichloride, dichlorostyrene and the like.

The polymerization temperature is not specifically limited, and −100 to 250° C. is usually adopted and −50 to 200° C. is preferably adopted. Further, the polymerization pressure is not limited, but is carried out usually under a pressure of 10 MPa or less and preferably 0.1 Mpa to 5 MPa. And, a chain transfer agent such as hydrogen or the like can be added in order to adjust the molecular weight of the polymer.

The monomer to be polymerized in the present invention is described in detail below.

The vinyl compound in the present invention is a vinyl compound (I) represented by the general formula $CH_2$=CH—R, wherein steric parameters Es and B1 of the substituent R are respectively −1.64 or less and 1.53 or more, or a vinyl compound (II) represented by the general formula $CH_2$=CH—R', wherein a substituent R' is a secondary or tertiary alkyl group.

The vinyl compound (I) is represented by the general formula $CH_2$=CH—R, wherein steric parameters Es and B1 of the substituent R are respectively −1.64 or less and 1.53 or more.

Herein, the "steric parameters Es and B1" are parameters indicative of the steric bulkiness of a substituent (in detail, Es and B1 indicate three-dimensional extent and two-dimensional extent, respectively) and are determined by the method described in literature [C. HanschandA. Leo: "Exploring QSAR Fundamentals and Applications in Chemistry and Biology" Chapter 3 (ACS Professional Reference Book, Washington, D.C. (1995))].

In the present invention, steric parameter Es of the substituent R is preferably from −3.10 to −1.70, more preferably −2.80 to −1.72, further preferably −2.35 to −1.75, most preferably −2.10 to −1.75. While steric parameter B1 of the substituent R is preferably from 1.53 to 2.90, more preferably from 1.70 to 2.70, most preferably 1.91 ton 2.60.

When the parameter Es is more than −1.64 or the parameter Es is less than 1.53, an elastic recoverability and delayed recoverability of a resulting polymer may become inferior. Further, in the present invention, a vinyl compound in which the substituent R is a hydrocarbon group is preferable, and that in which the substituent R is a saturated hydrocarbon group is more preferable.

Specific examples of the vinyl compound (I) include 3-methyl-1-butene(Es: −1.71, B1: 1.90), 3-methyl-1-pentene(Es: −2.37, B1: 1.90), vinylcyclopentane (Es: −1.75, B1: 1.90), vinylcyclohexane(Es: −1.81, B1: 1.91), 4,4-dimethyl-1-pentene(Es: −2.91, B1: 2.47), 3-ethyl-1-pentene (Es: −3.12, B1: 2.13), 3,3-dimethyl-1-butene(Es: −2.78, B1: 2.60), 3,3-dimethyl-1-pentene(Es: −3.40, B1: 2.60), 3,5,5-trimethyl-1-hexene(Es: −3.09, B1: 1.90), 3,4-dimethyl-1-pentene(Es: −3.05, B1: 1.90), 3-ethyl-4-methyl-1-pentene (Es: −4.35, B1: 1.90), and 3,3-dimethyl-4-methyl-1-pentene (Es: −4.66, B1: 2.60).

Further, a vinyl compound having a bulky substituent used in the present invention is a vinyl compound (II) represented by the general formula $CH_2$=CH—R', wherein a substituent R' is a secondary or tertiary alkyl group.

As the secondary or tertiary alkyl group (R'), a secondary alkyl group having 3 to 20 carbon atoms and a tertiary alkyl group having 4 to 20 carbon atoms are preferable. R' may be a cycloalkyl group, and preferably a cycloalkyl group having 3- to 16-members ring, more preferably a cycloalkyl group of 3- to 10-members ring having 3 to 20 carbon atoms. As R', a cycloalkyl group having 3- to 16-members ring, more preferably a cycloalkyl group of 3- to 10-members ring having 3 to 20 carbon atoms and a tertiary alkyl group having 4 to 20 carbon atoms are preferable.

Specific examples of the vinyl compound (II) include vinylcyclopropane, vinylcyclobutane, vinylcyclopentane, vinylcyclohexane, vinylcycloheptane, vinylcyclooctane, 3-methyl-1-butene, 3-methyl-1-pentene, 3-methyl-1-hexene, 3-methyl-1-heptene, 3-methyl-1-octene, 3,3-dimethyl-1-butene, 3,3-dimethyl-1-pentene, 3,3-dimethyl-1-hexene, 3,3-dimethyl-1-heptene, 3,3-dimethyl-1-octene, 3,4-dimethyl-1-pentene, 3,4-dimethyl-1-hexene, 3,4-dimethyl-1-heptene, 3,4-dimethyl-1-octene, 3,5-dimethyl-1-hexene, 3,5-dimethyl-1-heptene, 3,5-dimethyl-1-octene, 3,6-dimethyl-1-heptene, 3,6-dimethyl-1-octene, 3,7-dimethyl-1-octene, 3,3,4-trimethyl-1-pentene, 3,3,4-trimethyl-1-hexene, 3,3,4-trimethyl-1-heptene, 3,3,4-trimethyl-1-octene, 3,4,4-trimethyl-1-pentene, 3,4,4-trimethyl-1-hexene, 3,4,4-trimethyl-1-heptene, 3,4,4-trimethyl-1-octene, 5-vinyl-2-norbornane, 1-vinyladamantane, 4-vinyl-1-cyclohexene and the like, preferably vinylcyclopentane, vinylcyclohexane, vinylcycloheptane, vinylcyclooctane, 5-vinyl-2-norbornane, 3-methyl-1-butene, 3-methyl-1-pentene, 3-methyl-1-hexene, 3,3-dimethyl-1-butene, 3,3-dimethyl-1-pentene, 3,4-dimethyl-1-pentene, 3,5-dimethyl-1-hexene, 3,3,4-trimethyl-1-pentene and 3,4,4-trimethyl-1-pentene, particularly preferably vinylcyclohexane, 5-vinyl-2-norbornane, 3-methyl-1-butene, 3-methyl-1-pentene, 3,3-dimethyl-1-butene, 3,4-dimethyl-1-pentene and 3,3,4-trimethyl-1-pentene, most preferably vinylcyclohexane and 3-methyl-1-butene.

In the present invention, the vinyl compound having a bulky substituent is homo-polymerized or copolymerized. In copolymerization, copolymerization of two or more of the vinyl compounds having a bulky substituent and copolymerization of the vinyl compound having a bulky substituent and an addition polymerizable monomer except the vinyl compound (I) or (II) are possible.

In the latter case, the present invention shows high copolymerizability.

As the addition polymerizable monomer other than the vinyl compounds (I) (sometimes, referred to simply as "olefin"), an olefin is preferable, and ethylene and/or α-olefin is more preferable. Specific examples of the α-olefin include preferably straight chain olefins such as propylene, 1-butene, 1-pentene, 1-hexene, 1-heptene, 1-octene, 1-nonene, 1-decene and the like, preferably propylene, 1-butene, 1-hexene and 1-octene, and more preferably propylene, 1-butene or 1-hexene.

In the copolymer of the present invention, the content of a unit derived from the vinyl compound (I) or (II) copolymerized (referred to simply as "vinyl compound (I) or (II)") can be adopted in a wide range as 0.1 to 99 mol %, preferably 5 to 99 mol %, further preferable 15 to 99 mol %, most preferably 25 to 99 mol %. It is not preferable in terms of transparency when the content of the vinyl compound (I) or (II) unit in the copolymer is too low because the resulting copolymer may form crystal in its skeleton due to sequence of the olefin units. The content of the vinyl compound (I) or (II) can be determined by $^1$H-NMR.

In the polymer skeleton (when branched polymer chains in the polymer molecular chain, exist, those are also included) of the polymer prepared by the present invention, the secondary or tertiary carbon atoms derived from the vinyl compound (I) or (II) having a bulky substituent, exist. Further, when the copolymer is a copolymer of ethylene and the vinyl compound (I) or (II), secondary groups derived from ethylene exist. Moreover, when the copolymer is a copolymer of α-olefin such as propylene and the vinyl compound (I) or (II), secondary and tertiary groups derived from the α-olefin, exist. A structure in which tertiary carbon groups are mutually divided by one methylene group, a structure in which tertiary carbon groups are mutually divided by two methylene groups, a structure in which tertiary carbon groups are mutually divided by three methylene groups, or a structure in which tertiary carbon groups are mutually divided by four or more of methylene group, exists depending on sequences in the polymer skeleton. Such polymer structures can be determined by $^{13}$C-NMR.

As the copolymer produced by the present invention, a copolymer having sequences in which two or more pf the vinyl compound having a bulky substituent are bonded to the same direction (so-called "head to tail bonding") can be also obtained, and in that case, a structure in which tertiary carbons are mutually divided by one methylene group, exists.

Specific examples of other vinyl compounds to be copolymerized except olefins include methyl vinyl ether, ethyl vinyl ether, acrylic acid, methyl acrylate, ethyl acrylate, methyl methacrylate, acrylonitrile and vinyl acetate. One or more of them are preferably used.

The present invention will be described in more detail by way of Examples and Comparative Examples. However, the present invention is not limited thereto.

The properties of each copolymer in the Examples were determined by the following methods.

(1) The intrinsic viscosity [η] was measured at 135° C. with an Ubbellohde viscometer using tetralin as a solvent.

(2) The glass transition point and melting point were measured using a DSC (SSC-5200 manufactured by SEIKO INSTRUMENT CO.) under the following conditions and was determined from its inflection point.

Heating: from 20° C. to 200° C. (20° C./min), kept for 10 min.

Cooling: from 200° C. to −50° C. (20° C./min), kept for 10 min.

Measurement: from −50° C. to 300° C. (20° C./min)

(3) The content of a vinylcyclohexane unit in a copolymer and the structure of the copolymer were determined by $^{13}$C-NMR analysis.

$^{13}$C-NMR apparatus: DRX600 manufactured by BRUKER CO.

Solvent for the measurement: mixture of orthodichlorobenzene and orthodichlorobenzene-d4 at a ratio of 4:1 (volume ratio)

Temperature for the measurement: 135° C.

EXAMPLE 1

Into a 400 ml-autoclave having an atmosphere replaced with argon were introduced 21 ml of vinylcyclohexane and 125 ml of dehydrated toluene. After heating to 30° C., ethylene was charged therein to 0.8 MPa. Further, 2.8 ml of a solution of methylalumoxane in toluene [MMAO produced by Tosoh Akzo Corp., Al atom converted concentration=6 wt %] was charged and subsequently a solution (actually in a suspended state) of 1.1 mg of isopropylidenebis(1-indenyl)zirconium dichloride (manufactured by Boulder Co. Ltd.) dissolved in 1.1 ml of dehydrated toluene was charged. There action liquid was stirred for one hour and then poured into 500 ml of ethanol, and a precipitated white solid was collected through filtration. The solid was washed with methanol and then dried under reduced pressure, to obtain 26.23 g of a polymer.

The polymer had an intrinsic viscosity [72] of 0.63 dl/g, and vinylcyclohexane unit content of 18 mol %.

A pressed sheet formed of the polymer had very high transparency and was excellent in flexibility and elastic recoverability. The $^{13}$C-NMR spectrum of the polymer thus obtained is shown in FIG. 1. It was confirmed that the polymer had a structure in which carbons substituted with a cyclohexyl group are mutually divided by three methylene groups and that in which carbons substituted with a cyclohexyl group are mutually divided by one methylene group.

EXAMPLE 2

Example 1 was repeated except that the solution of 1.1 mg of isopropylidenebis(1-indenyl)zirconium dichloride dissolved in 1.1 ml of dehydrated toluene was changed to a solution of 1.3 mg of isopropylidenebis(4,5-benzo-1-indenyl)zirconium dichloride (manufactured by Boulder Co. Ltd.) dissolved in 1.3 ml of dehydrated toluene, to obtain 22.36 g of a polymer. The polymer had an intrinsic viscosity [η] of 0.69 dl/g, and vinylcyclohexane unit content of 20 mol %.

Figure 2:
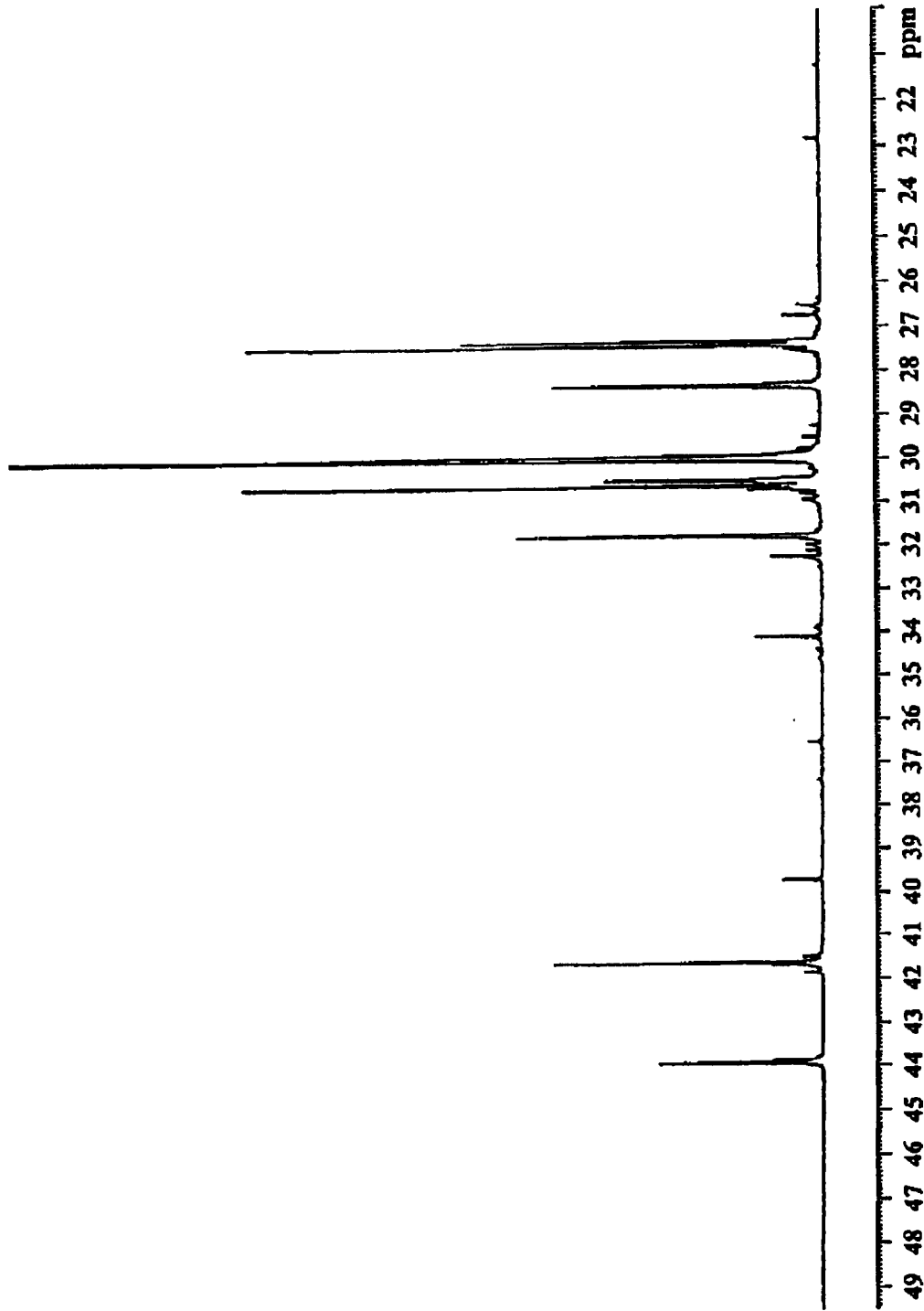
FIG. 2 is a $^{13}$C-NMR spectrum of the polymer obtained in Example 2.

A pressed sheet formed of the polymer had very high transparency and was excellent in flexibility and elastic recoverability. The $^{13}$C-NMR spectrum of the polymer thus obtained is shown in FIG. 2. It was confirmed that the polymer had a structure in which carbons substituted with a cyclohexyl groups are mutually divided by three methylene groups and that in which carbons substituted with a cyclohexyl groups are mutually divided by one methylene group.

Comparative Example 1

Figure 3:
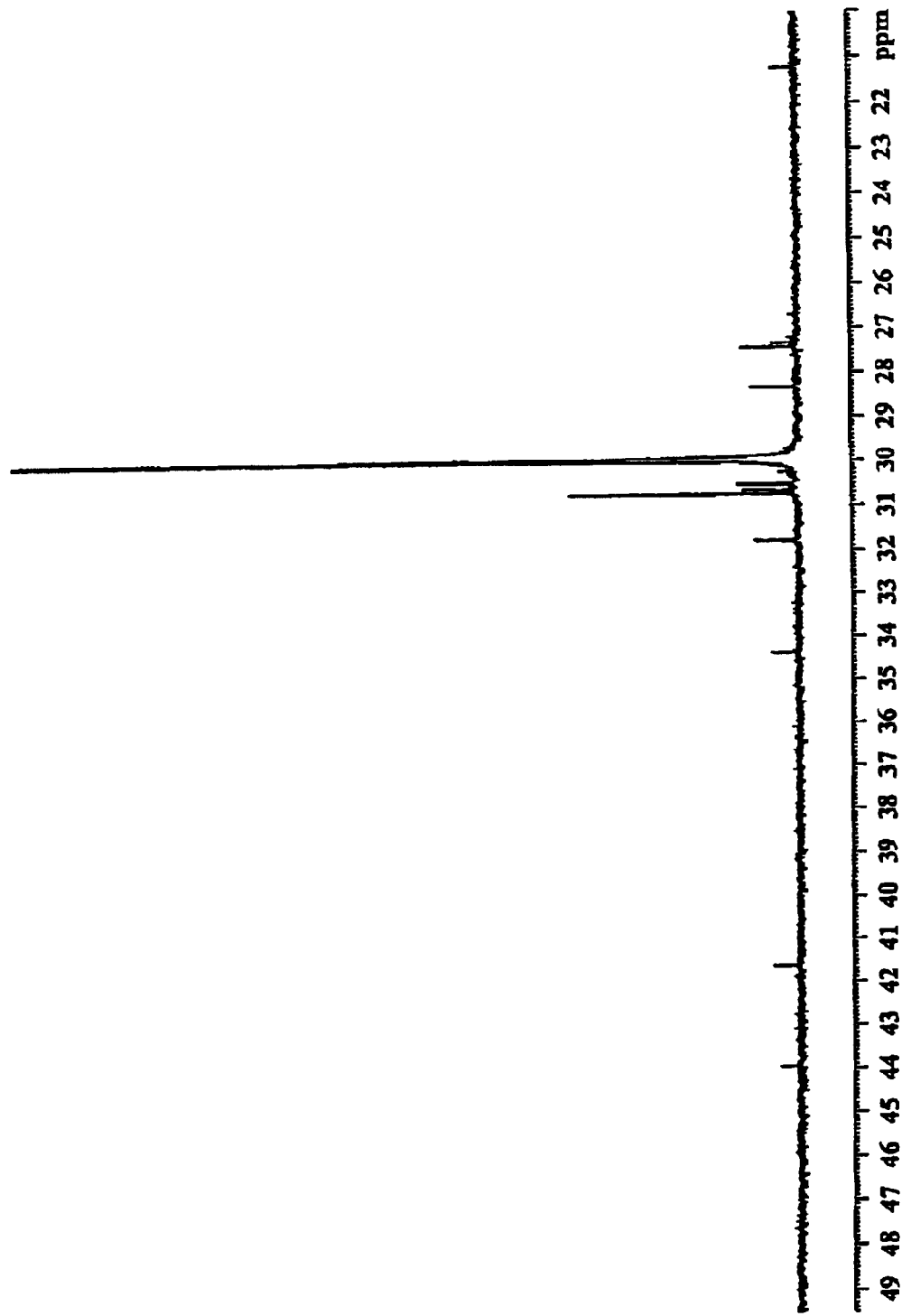
FIG. 3 is a $^{13}$C-NMR spectrum of the polymer obtained in Comparative Example 1.

Example 1 was repeated except that 125 ml of dehydrated toluene was changed to 122 ml of dehydrated toluene, and the solution of 1.1 mg of isopropylidenebis(1-indenyl) zirconium dichloride dissolved in 1.1 ml of dehydrated toluene was changed to a solution of 2.2 mg of biscyclopentadienylzirconium dichloride (manufactured by Strem Co. Ltd.) dissolved in 4.5 ml of dehydrated toluene, to obtain 11.70 g of a polymer. The vinylcyclohexane unit content was 0.31 mol %. The $^{13}$C-NMR spectrum of the polymer thus obtained is shown in FIG. 3.

EXAMPLE 3

Into a 400 ml-autoclave having an atmosphere replaced with argon were introduced 103 ml of vinylcyclohexane and 44 ml of dehydrated toluene. After heating to 30° C., ethylene was charged therein to 0.8 MPa. Further, 2.8 ml of a solution of methylalumoxane in toluene [MMAO produced by Tosoh Akzo Corp., Al atom converted concentration=6 wt %] was charged and subsequently a solution (actually in a suspended state) of 1.1 mg of isopropylidenebis(1-indenyl)zirconium dichloride (manufactured by Boulder Co. Ltd.) dissolved in 1.1 ml of dehydrated toluene was charged. There action liquid was stirred for one hour and then poured into 500 ml of ethanol, and a precipitated white solid was collected through filtration. The solid was washed with methanol and then dried under reduced pressure, to obtain 18.63 g of a polymer.

The polymer had an intrinsic viscosity [η] of 0.34 dl/g, and vinylcyclohexane unit content of 36 mol %.

A pressed sheet formed of the polymer had very high transparency and was excellent in flexibility and elastic recoverability.

The polymer was confirmed to have a structure in which carbon atoms substituted with vinylcyclohexyl groups were separated from each other by one methylene group.

Figure 4:
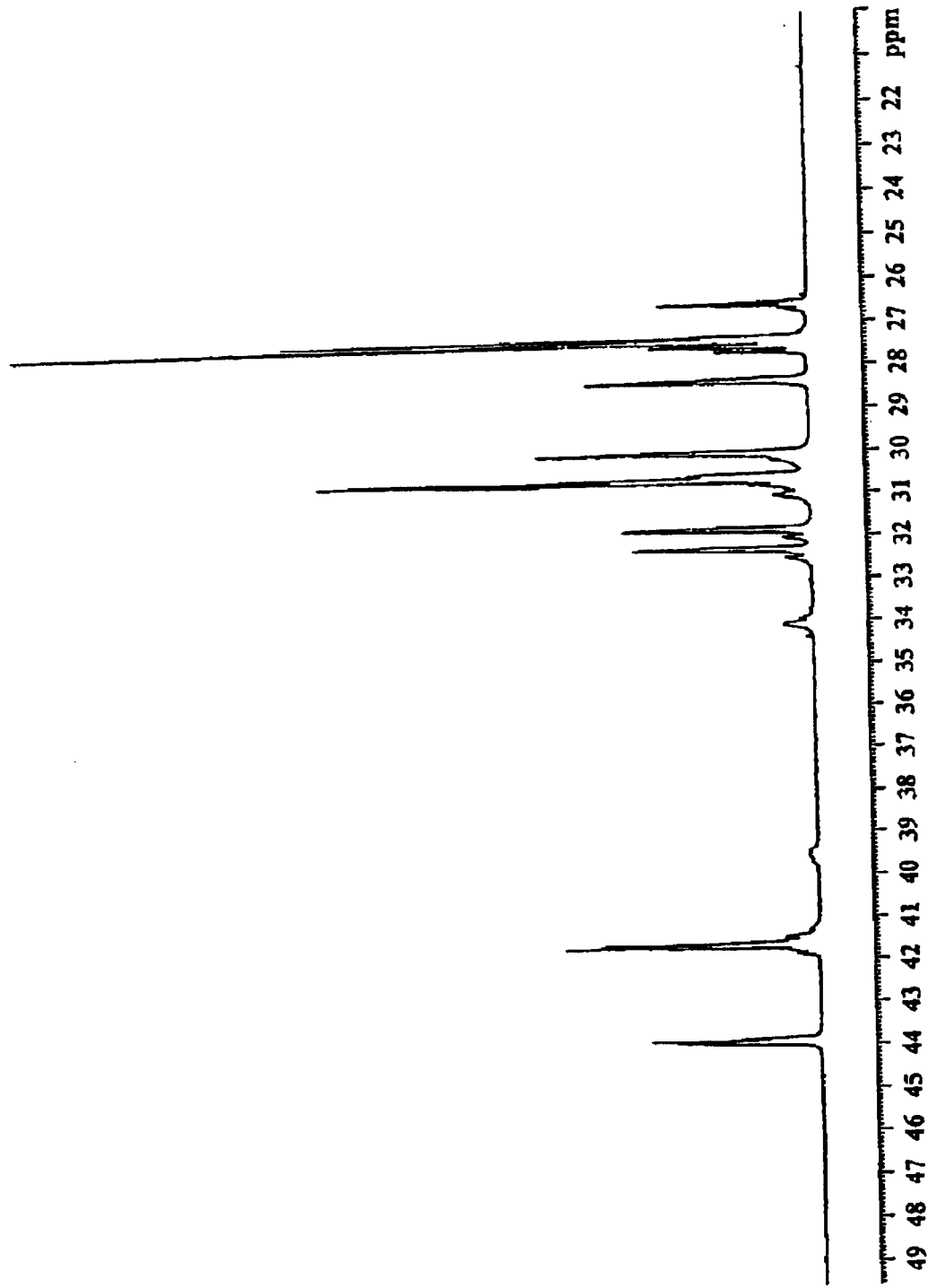
FIG. 4 is a $^{13}$C-NMR spectrum of the polymer obtained in Example 3.

The $^{13}$C-NMR spectrum of the polymer thus obtained is shown in FIG. 4. It was confirmed that the polymer had a structure in which carbons substituted with a cyclohexyl group are mutually divided by three methylene groups and that in which carbons substituted with a cyclohexyl group are mutually divided by one methylene group.

Comparative Example 2

Figure 5:
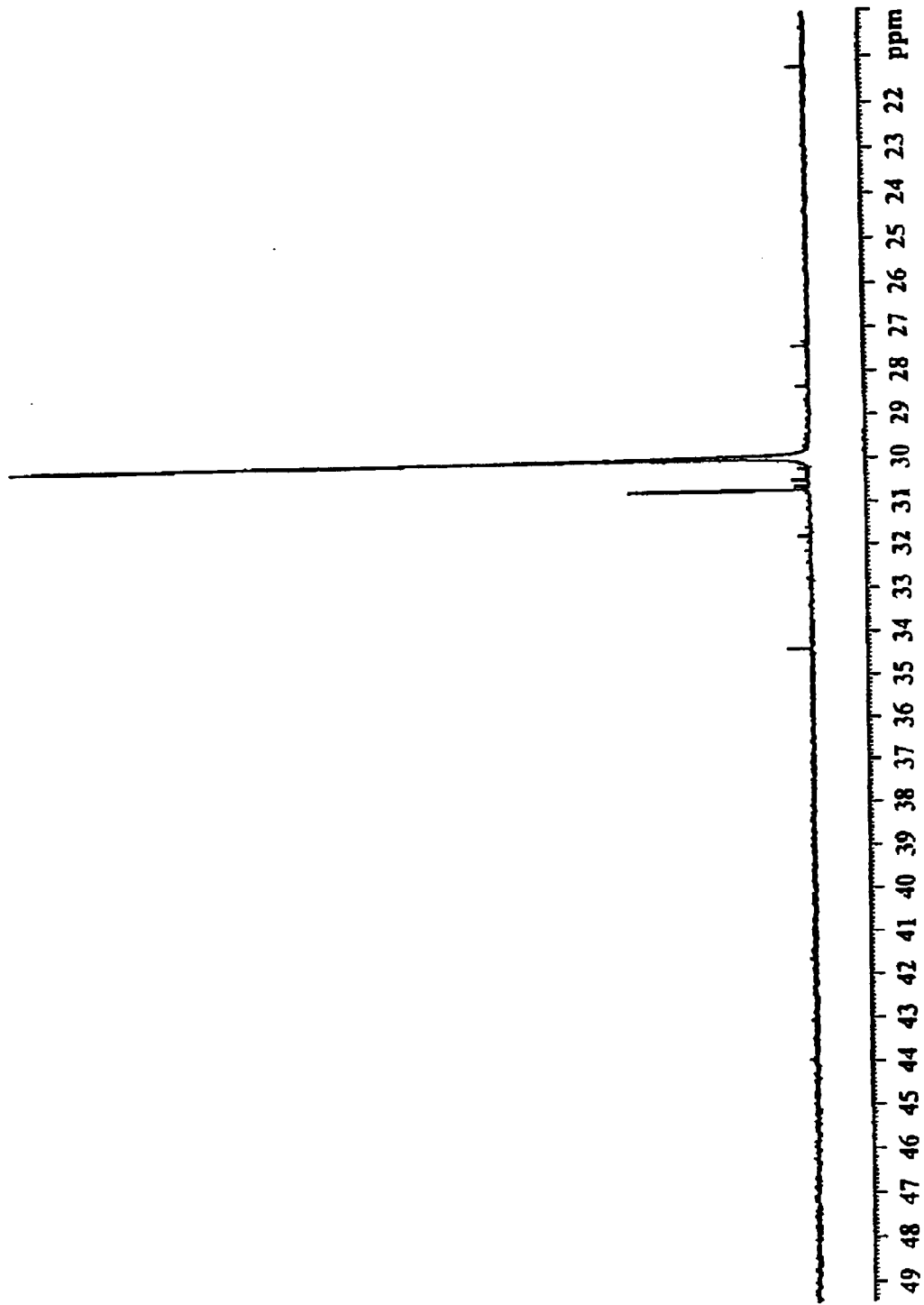
FIG. 5 is a $^{13}$C-NMR spectrum of the polymer obtained in Comparative Example 2.

Example 3 was repeated except that 44 ml of dehydrated toluene was changed to 40 ml of dehydrated toluene, and the solution of 1.1 mg of isopropylidenebis(1-indenyl) zirconium dichloride dissolved in 1.1 ml of dehydrated toluene was changed to a solution of 2.2 mg of biscyclopentadienylzirconium dichloride (manufactured by Strem Co. Ltd.) dissolved in 4.5 ml of dehydrated toluene, to obtain 0.10 g of a polymer. The vinylcyclohexane unit content was 0.23 mol %. The $^{13}$C-NMR spectrum of the polymer thus obtained is shown in FIG. 5.

EXAMPLE 4

Into a 300 ml-glass reactor having an atmosphere replaced with argon were introduced 68.4 ml of vinylcyclohexane and 26.6 ml of dehydrated toluene. After heating to 30° C., ethylene was charged therein to 0.1 MPa. Further, 2.8 ml of a solution of methylalumoxane in toluene [MMAO produced by Tosoh Akzo Corp., Al atom converted concentration=6 wt %] was charged and subsequently a solution (actually in a suspended state) of 1.1 mg of isopropylidenebis(1-indenyl)zirconium dichloride (manufactured by Boulder Co. Ltd.) dissolved in 2.2 ml of dehydrated toluene was charged. There action liquid was stirred for 40 minutes and then poured into 500 ml of ethanol, and a precipitated white solid was collected through filtration. The solid was washed with methanol and then dried under reduced pressure, to obtain 20.80 g of a polymer.

The polymer had an intrinsic viscosity [η] of 0.35 dl/g, a glass transition temperature of 93° C. and vinylcyclohexane unit content of 82 mol %.

Figure 6:
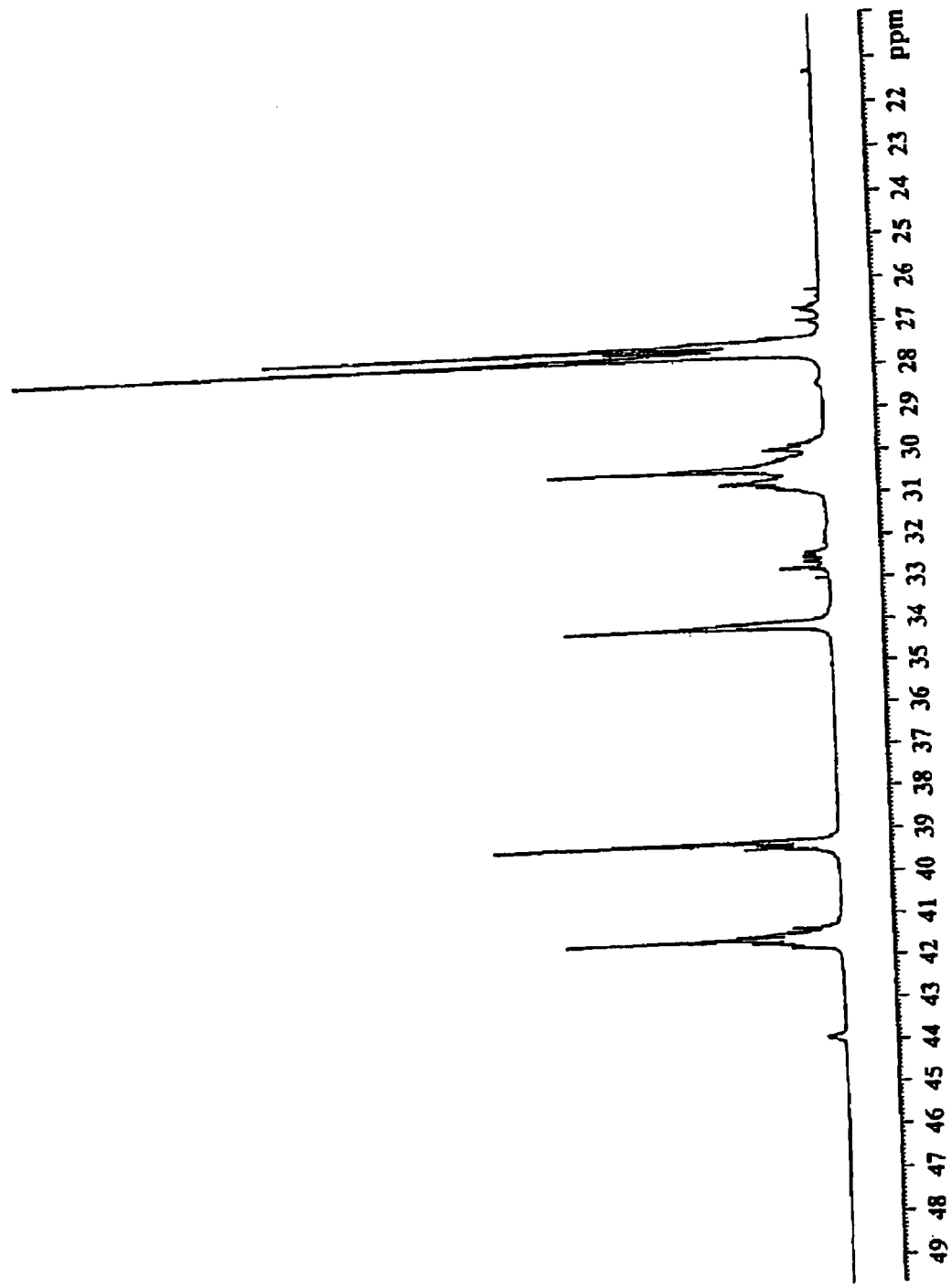
FIG. 6 is a $^{13}$C-NMR spectrum of the polymer obtained in Example 4.

A pressed sheet formed of the polymer had very high transparency. The $^{13}$C-NMR spectrum of the polymer thus obtained is shown in FIG. 6. It was confirmed that the polymer had a structure in which carbons substituted with a cyclohexyl group are mutually divided by three methylene groups and that in which carbons substituted with a cyclohexyl group are mutually divided by one methylene group.

EXAMPLE 5

Into a 300 ml-glass reactor having an atmosphere replaced with argon were introduced 68.4 ml of vinylcyclohexane and 3 ml of dehydrated toluene. After heating to 30° C., ethylene was charged therein to 0.1 MPa. Further, 6.9 ml of a solution of methylalumoxane in toluene [MMAO produced by Tosoh Akzo Corp., Al atom converted concentration=6 wt %] was charged and subsequently a solution of 21.6 mg of isopropylidenebis(1-indenyl)zirconium dichloride (manufactured by Boulder Co. Ltd.) dissolved in 21.6 ml of dehydrated toluene was charged. The reaction liquid was stirred for one hour and then poured into 500 ml of ethanol, and a precipitated white solid was collected through filtration. The solid was washed with ethanol and then dried under reduced pressure, to obtain 44.40 g of a polymer.

The polymer had a melting points of 238° C. and 381° C.

Figure 7:
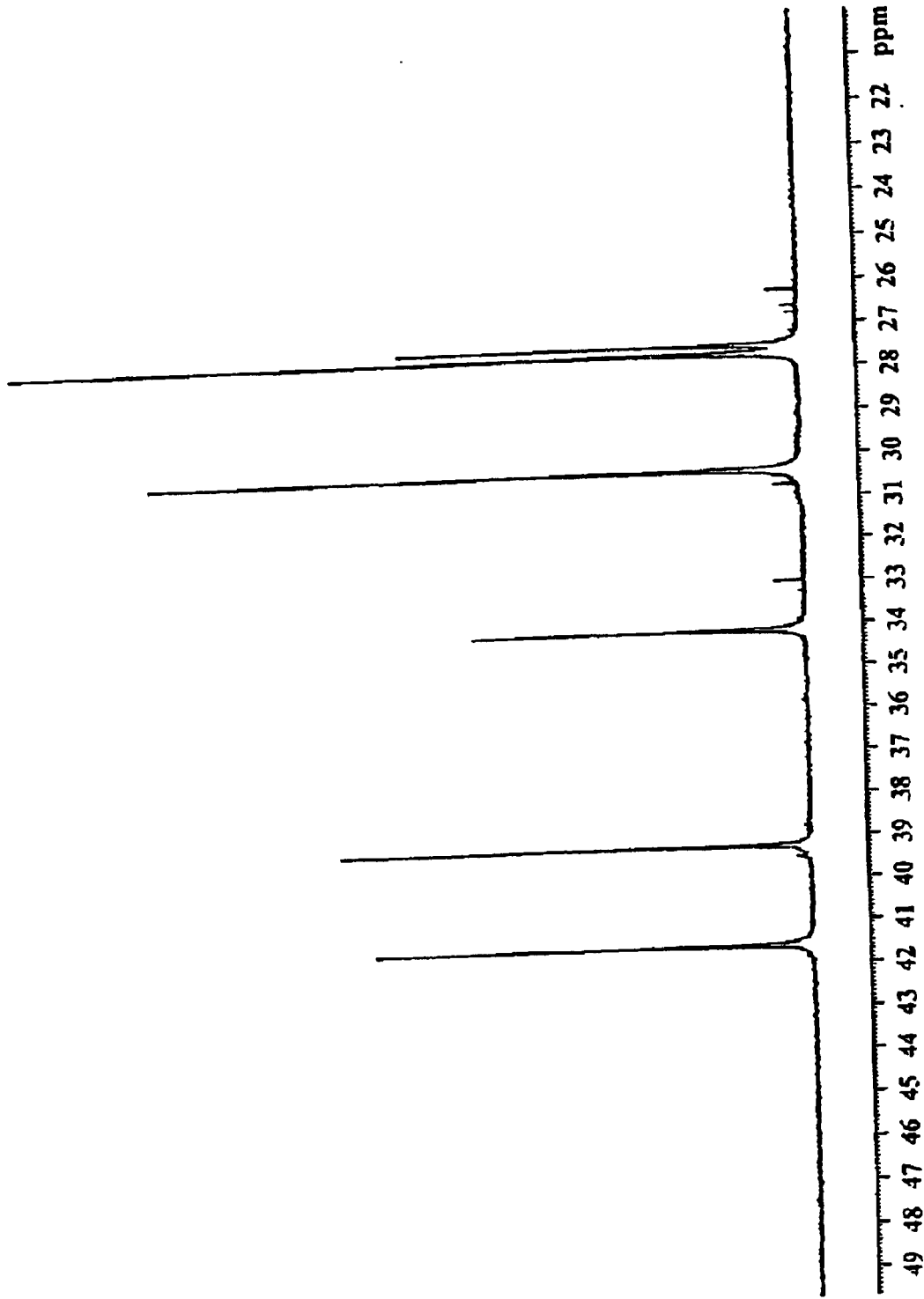
FIG. 7 is a $^{13}$C-NMR spectrum of the polymer obtained in Example 5.

The $^{13}$C-NMR spectrum of the polymer thus obtained is shown in FIG. 7.

EXAMPLE 6

Into a 300 ml-glass reactor having an atmosphere replaced with argon were introduced 68.4 ml of vinylcyclohexane and 17.3 ml of dehydrated toluene. After heating to 30° C., ethylene was charged therein to 0.1 MPa. Further, 5.6 ml of a solution of methylalumoxane in toluene [MMAO produced by Tosoh Akzo Corp., Al atom converted concentration=6 wt %] was charged and subsequently a solution (actually in a suspended state) of 4.3 mg of isopropylidenebis(1-indenyl)zirconium dichloride (manufactured by Boulder Co. Ltd.) dissolved in 8.7 ml of dehydrated toluene was charged. The reaction liquid was stirred for one hour and then poured into 500 ml of ethanol, and a precipitated white solid was collected through filtration. The solid was washed with ethanol and then dried under reduced pressure, to obtain 29.00 g of a polymer.

The polymer had an intrinsic viscosity [η] of 0.18 dl/g, a glass transition temperature of 62° C. and vinylcyclohexane unit content of 55 mol %.

Figure 8:
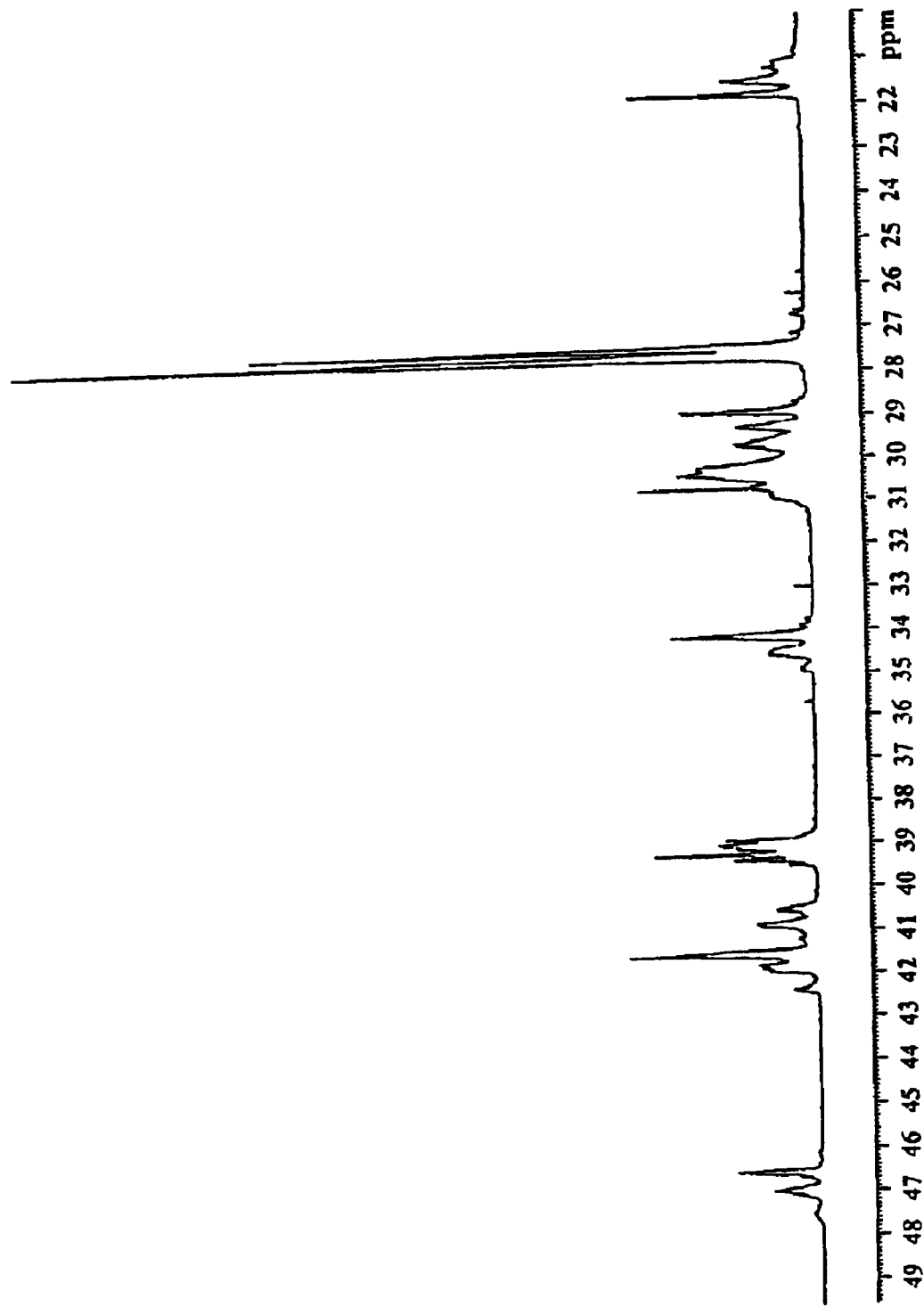
FIG. 8 is a $^{13}$C-NMR spectrum of the polymer obtained in Example 6.

A pressed sheet formed of the polymer had very high transparency. The $^{13}$C-NMR spectrum of the polymer thus obtained is shown in FIG. 8.

EXAMPLE 7

Into a 400 ml-autoclave having an atmosphere replaced with argon were introduced 180 ml of 3,3-dimthyl-1-butene and 5 ml of dehydrated toluene. After heating to 30° C., ethylene was charged therein to 0.2 MPa. Further, 5.6 ml of a solution of methylalumoxane in toluene [MMAO produced by Tosoh Akzo Corp., Al atom converted concentration=6 wt %] was charged and subsequently a solution (actually in a suspended state) of 4.3 mg of isopropylidenebis(1-indenyl)zirconium dichloride (manufactured by Boulder Co. Ltd.) dissolved in 8.7 ml of dehydrated toluene was charged. The reaction liquid was stirred for one hour and then poured into 500 ml of ethanol, and a precipitated white solid was collected through filtration. The solid was washed with ethanol and then dried under reduced pressure, to obtain 1.98 g of a polymer.

The polymer had an intrinsic viscosity [η] of 2.13 dl/g, melting point of 123° C. and 3,3-dimthyl-1-butene unit content of 2.3 mol %.

Figure 9:
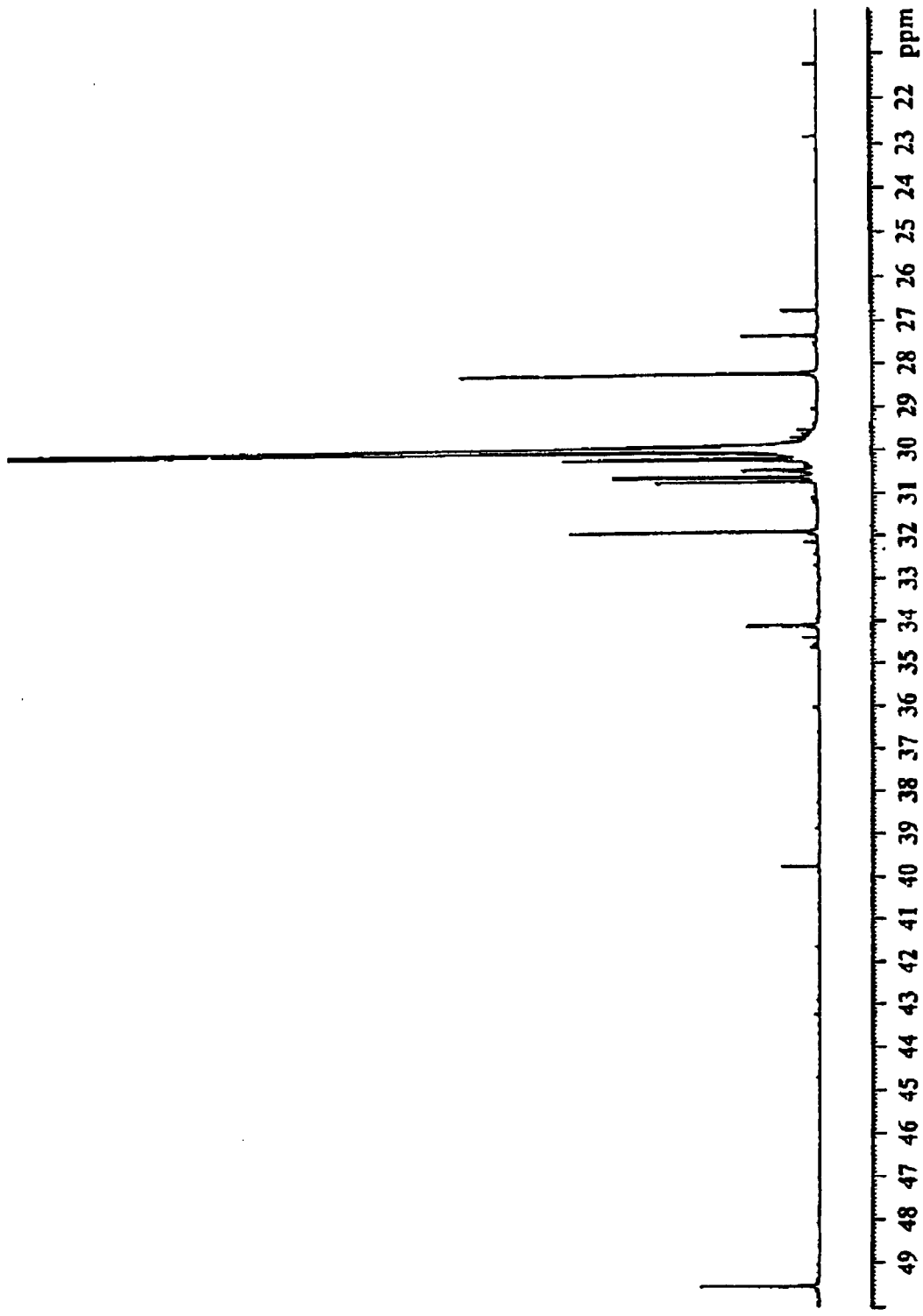
FIG. 9 is a $^{13}$C-NMR spectrum of the polymer obtained in Example 7.

A pressed sheet formed of the polymer had very high transparency and was excellent in flexibility and elastic recoverability. The $^3$C-NMR spectrum of the polymer thus obtained is shown in FIG. 9.

As described above, according to the present invention, there is provided a process for efficiently producing a polymer or copolymer containing units of vinyl compound having a bulky substituent.

What is claimed is:

1. A process for producing a polymer which comprises polymerizing a vinyl compound selected from the group consisting of 3, 3-dimethyl-1-butene and vinyl cyclohexane, in the presence of a catalyst obtained by combining:

(A) a transition metal compound represented by the general formula [1]

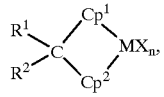

[1]

wherein M represents a transition metal; each of $Cp^1$ and $Cp^2$ independently an $\eta^5$-indenyl group of an $\eta^5$-substituted indenyl group; each of $R^1$ and $R^2$ independently represents a hydrogen atom or hydrocarbon group having 1 to 20 carbon atoms, and they may connect and form a ring structure through C; X represents a halogen atom, hydrocarbon group having 1 to 20 carbon atoms; and n represents a number of 2;

(B) at least one aluminum compound selected from the following (B1) to (B3):
  (B1) an organoaluminum compound represented by the general formula $E^1_a AlZ_{3-a}$,
  (B2) a cyclic aluminoxane having a structure represented by the general formula $\{-Al(E^2)-O-\}_b$, and
  (B3) a linear aluminoxane having a structure represented by the general formula $E^3\{-Al(E^3)-O-\}_c AlE^3_2$, (wherein $E^1$ to $E^3$ respectively represents a hydrocarbon group having 1 to 8 carbon atoms, and all of $E^1$, $E^2$ and $E^3$ may be the same or different; Z represents a hydrogen atom or a halogen atom, and all of Z may be the same or different; a represents a numeral satisfying $0<a \leq 3$; b represents an integer of not less than 2; and c represents an integer of not less than 1); and (C) at least one boron compound selected from the following (C1) to (C3):
  (C1) a boron compound represented by the general formula $BQ^1Q^2Q^3$,
  (C2) a boron compound represented by the general formula $G^+(BQ^1Q^2Q^3Q^4)^-$, and
  (C3) a boron compound represented by the general formula $(L-H)^+(BQ^1Q^2Q^3Q^4)^-$ (wherein B is a boron atom in the trivalent valence state, $Q^1$-$Q^4$ are a halogen atom, a hydrocarbon group, a halogenated hydrocarbon group, a substituted silyl group, an alkoxy group or a di-substituted amino group, which may be the same or different, respectively; $G^+$ is an inorganic or organic cation, L is a neutral Lewis base, and $(L-H)^+$ is a Brønsted acid).

2. The process according to claim 1, wherein the vinyl compound is homopolymerized.

3. The process according to claim 1, wherein a straight chain olefin is copolymerized with the vinyl compound.

4. The process according to claim 3, wherein the straight chain olefin is ethylene.

* * * * *